G. G. FRELINGHUYSEN & L. A. HAWTHORNE.
CASK WASHING MACHINE.
APPLICATION FILED APR. 9. 1915.

1,298,489.

Patented Mar. 25, 1919.
8 SHEETS—SHEET 2.

WITNESSES

INVENTOR

BY

ATTORNEYS

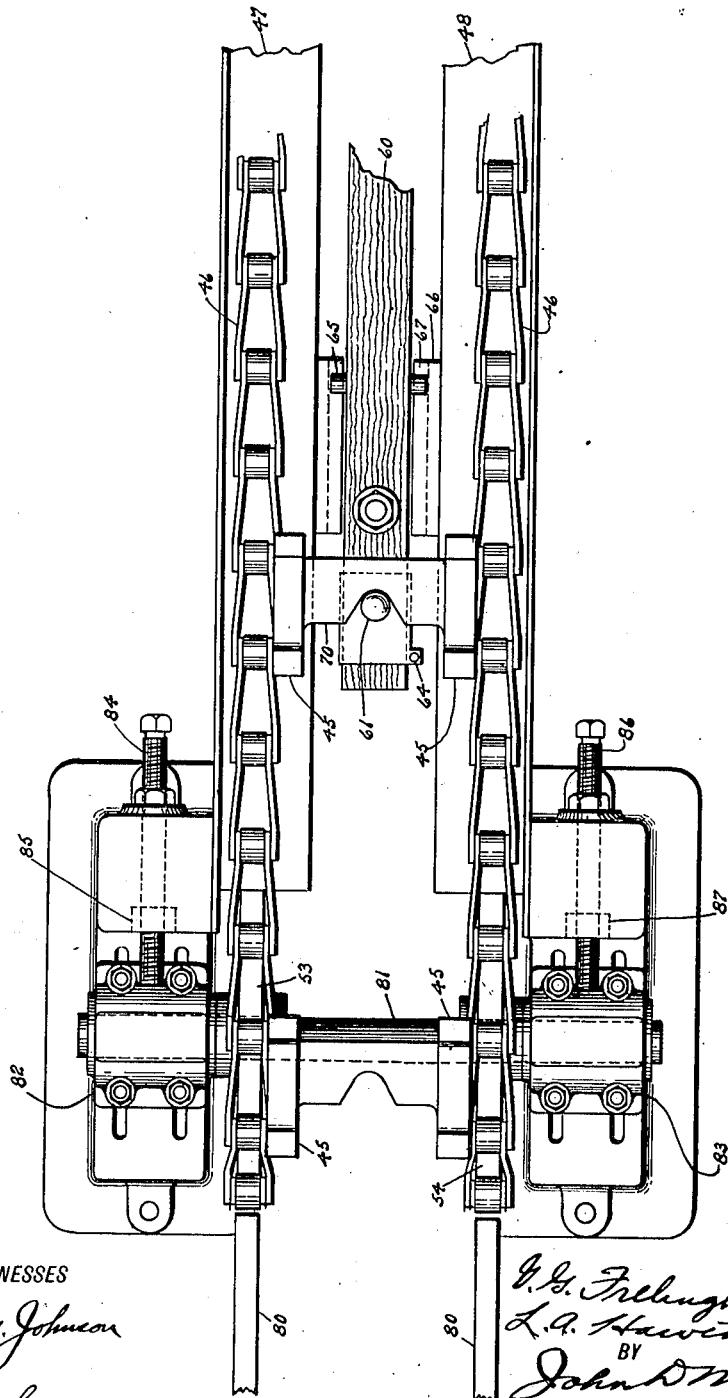

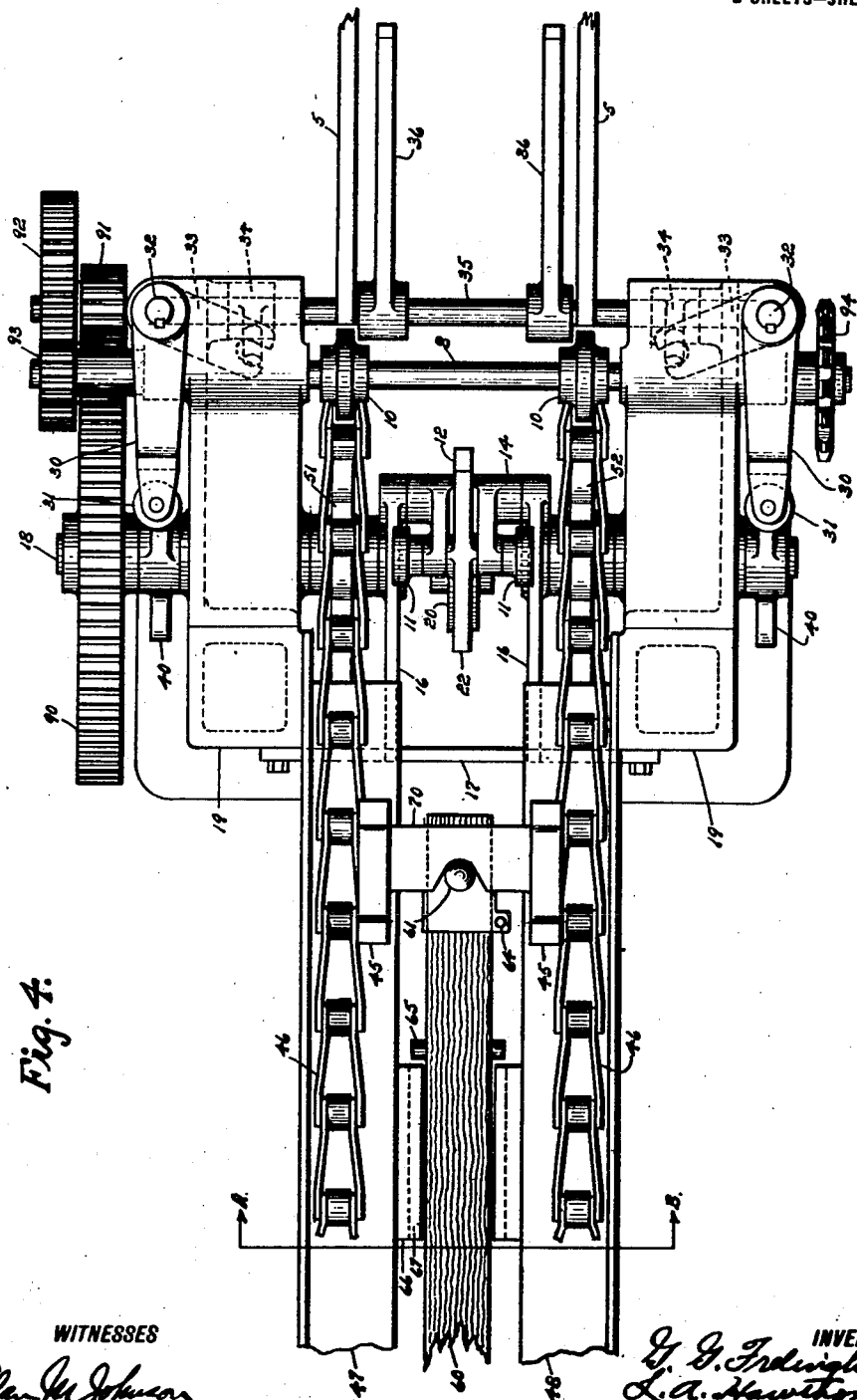

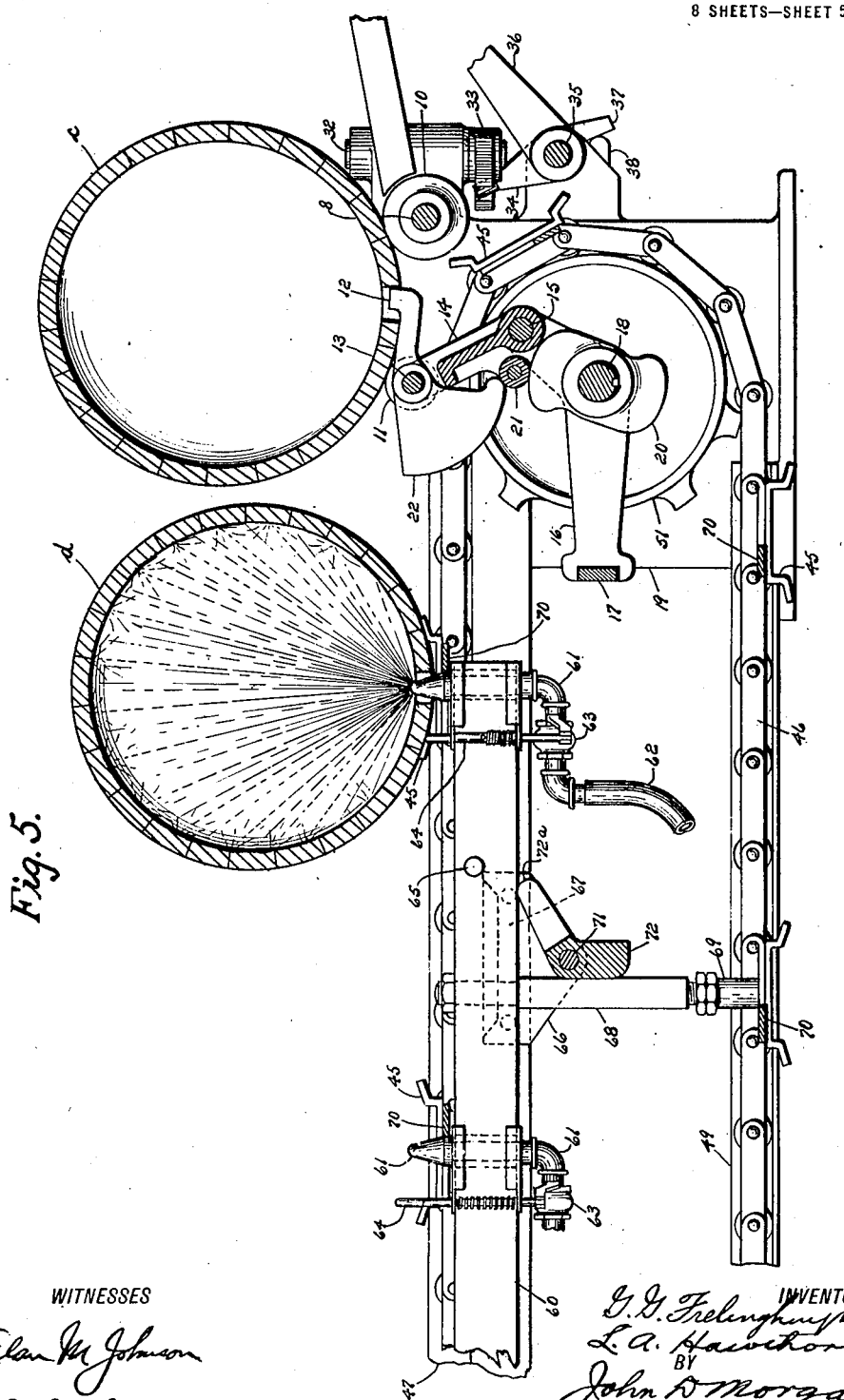

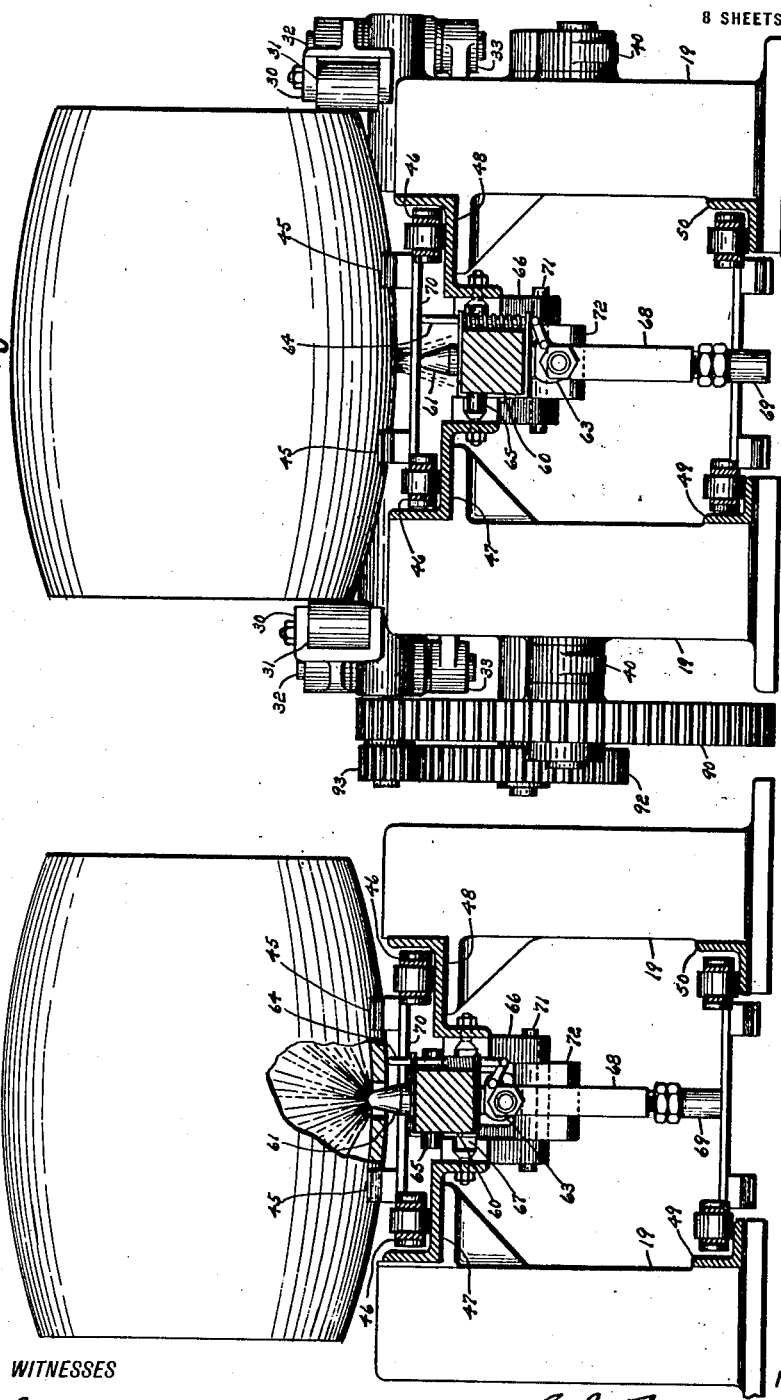

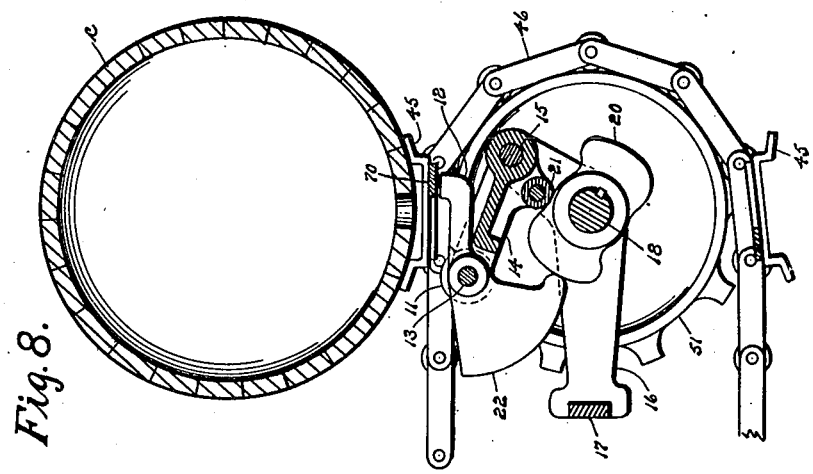

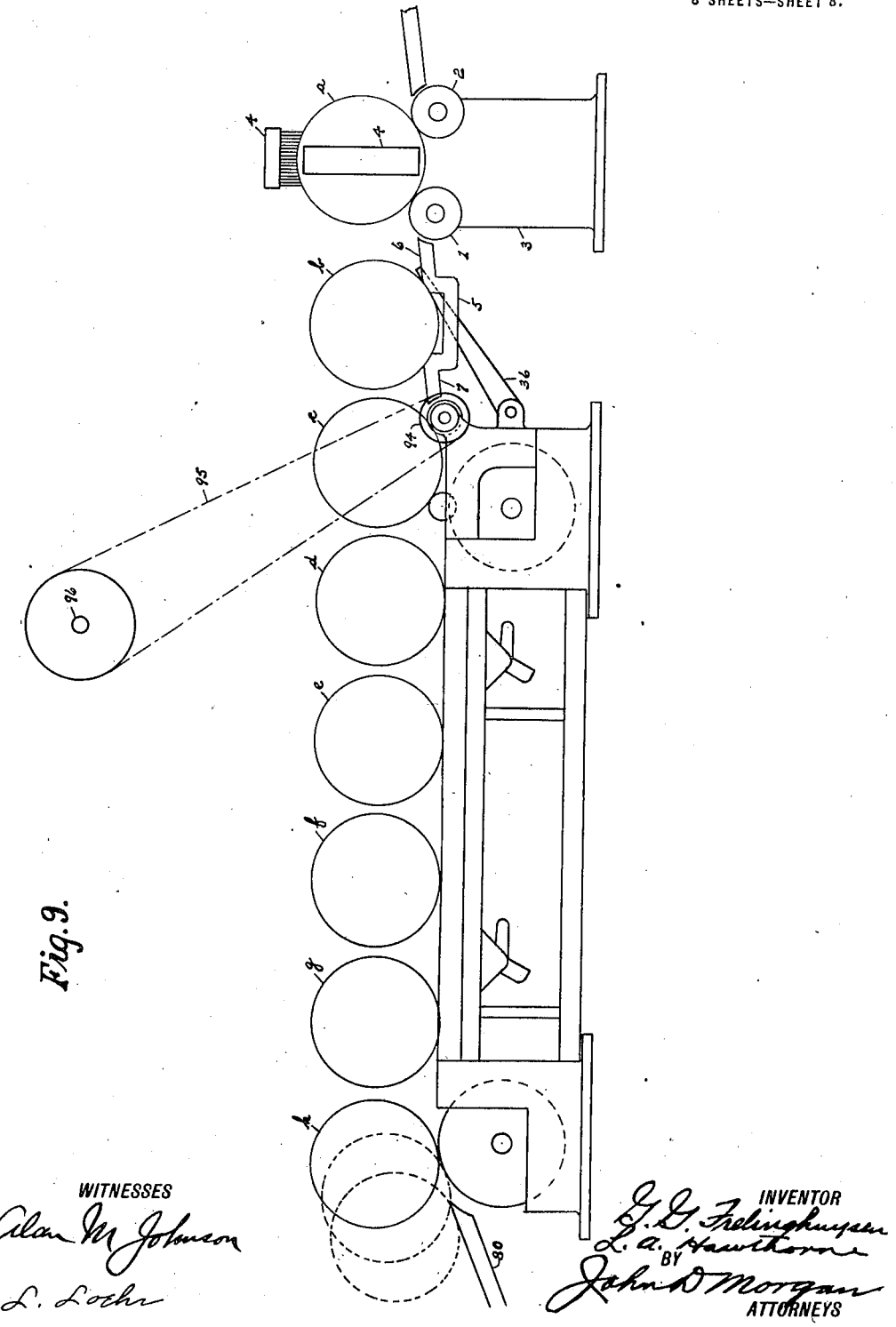

UNITED STATES PATENT OFFICE.

GEORGE G. FRELINGHUYSEN, OF MORRIS COUNTY, AND LOUIS A. HAWTHORNE, OF NEWARK, NEW JERSEY, ASSIGNORS TO STEEL UTILITIES, INCORPORATED, A CORPORATION OF NEW YORK.

CASK-WASHING MACHINE.

1,298,489.

Specification of Letters Patent.     Patented Mar. 25, 1919.

Application filed April 9, 1915. Serial No. 20,175.

*To all whom it may concern:*

Be it known that we, GEORGE G. FRELINGHUYSEN, of Morris County, N. J., and LOUIS A. HAWTHORNE, of Newark, N. J., citizens of the United States, have made Improvements in Cask-Washing Machines, of which the following is a specification.

The invention relates to cask washing machines, and more particularly to machines operating automatically to wash or cleanse casks interiorly, and in certain of its features the invention relates more especially to machines for projecting successively different washing fluids into the interior of the cask for purposes of cleansing and sterilization prior to re-filling. Other objects and advantages of the invention will be set forth hereinafter in part, and in part will be obvious herefrom.

The invention consists of the novel parts, constructions, arrangements, combinations and improvements herein shown and described.

The accompanying drawings, referred to herein and constituting a part hereof, illustrate one embodiment of the invention, and together with the description serve to explain the principles thereof.

Of the drawings:

Figures 1 and 2, taken together and placed end to end, constitute a front elevation of a machine constructed in accordance with the principles of the invention;

Figs. 3 and 4, taken together and placed end to end, constitute a top plan of the machine shown in Figs. 1 and 2;

Fig. 5 is a fragmentary, central vertical section through the right hand part of the machine, and corresponds substantially to Fig. 2;

Fig. 6 is a transverse vertical section on the line A—B of Fig. 4, with certain parts omitted, and the nozzle carrier in raised position;

Fig. 7 is a like transverse vertical section, substantially on the line A—B of Fig. 4, but showing the nozzle carrier bar in lower position;

Fig. 8 is a fragmentary vertical longitudinal section corresponding to a portion of the right hand end of Fig. 5, but showing the parts in different positions; and Fig. 9 is a side elevation, largely diagrammatic, showing the supply of casks from an exterior scrubbing machine, and showing the delivery mechanism.

Figure 1:
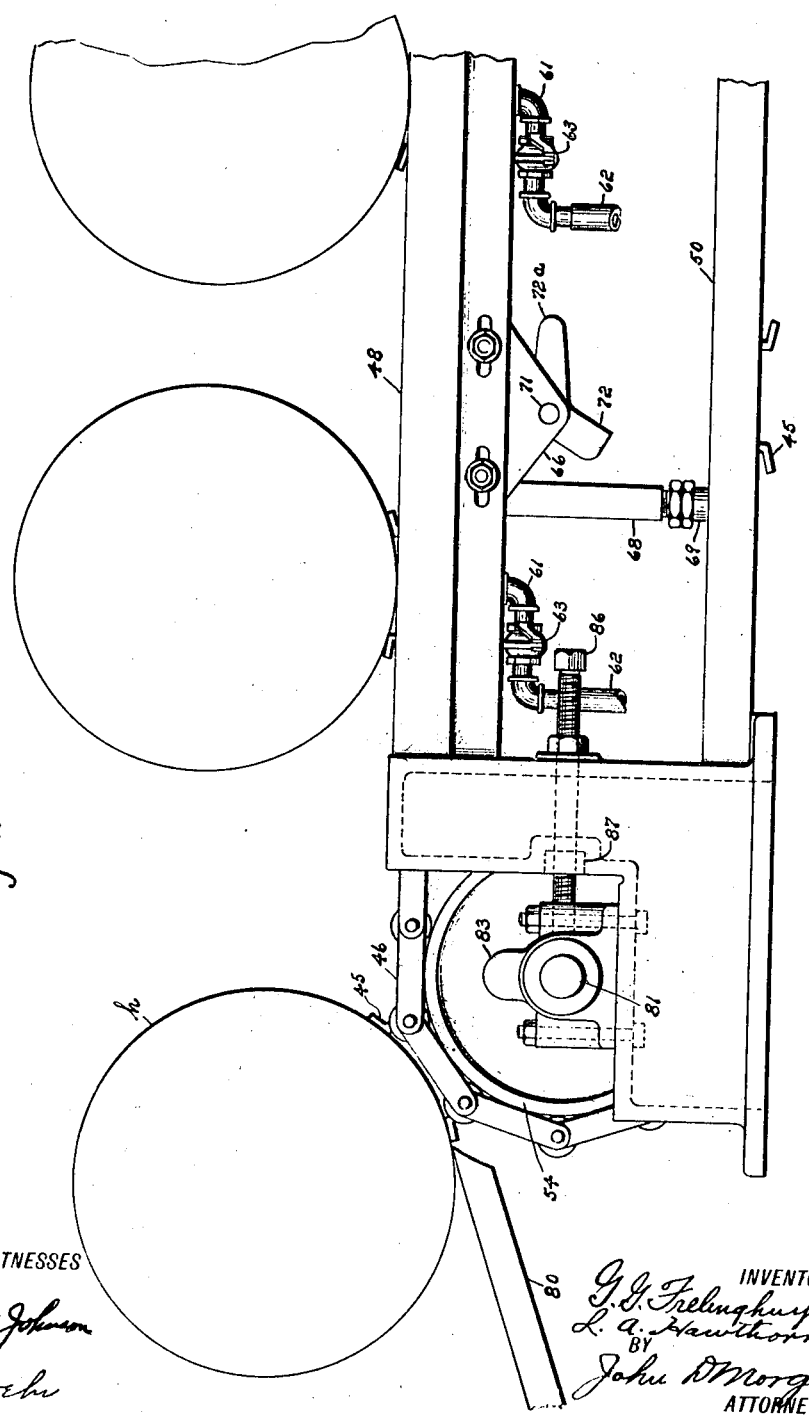

Referring by way of example to the exemplified embodiment of the invention, and considering in accordance with certain features of the invention the casks which are to be internally washed and sterilized as being supplied from mechanism for cleansing the exterior of the cask, and referring more particularly to Fig. 9 of the drawings, there is shown at the right of Fig. 9 mechanism for scrubbing the exterior of the cask. The cask $a$ is shown mounted in a supporting cradle, comprising rollers 1 and 2 separated from each other and substantially parallel, the cask $a$ resting thereupon. One of said rollers or set of rollers is driven, so that the cask is rotated substantially about its own axis. The rollers 1 and 2 are supported upon a base or frame 3. A suitable scrubbing device or mechanism 4 is provided, which scrubs the surface of the barrel as it rotates upon the rollers 1 and 2. A supply station or cradle 5 for the internal cask washing mechanism is provided, shown in Fig. 9, at the left of the scrubbing mechanism just described, and also shown at the right hand ends of Figs. 2 and 4, in fragmentary form. The cradle 5 receives the cask from the external washer, and is stationary, and is inclined downwardly at 6 and 7 upon either side of the position of rest for the cask $b$, which has just been exteriorly cleansed at $a$ and delivered automatically to the cradle 5. The cask $b$ is at the proper time automatically delivered to the position $c$, as will be later more fully described, and then passes through the machine to be internally washed and sterilized. So far as concerns many features of the invention, however, the casks to be internally washed and cleansed may be supplied to the mechanism for so cleansing them from other sources than the exterior cleansing mechanism described.

Means are provided by the invention for automatically supplying the casks to the internal washing mechanism, and means are likewise provided for alining the casks both circumferentially and longitudinally to bring the bung holes of the casks in alinement with the fluid projecting nozzles or like devices, which project the cleansing fluid into the cask. In the embodied form of such means, a station or cradle, indicated at c in Fig. 9, and shown at the right in Figs. 2 and 5, and also shown in Fig. 8, is provided.

At said station the cask c is deposited upon two rollers or sets of rollers 10 and 11, one of such rollers or sets of rollers being driven to rotate the cask circumferentially, that is, substantially about its own axis, to bring the cask bung hole into alinement, or alined position with respect to the fluid projecting nozzle. An alining stop 12 is adapted to automatically enter the cask bung hole and bring it to rest in alined position, the stop being retracted when the cask so alined passes on through the machine to be internally washed.

The stop 12 is pivotally mounted upon a shaft 13, upon which shaft the rolls 11 are also mounted, the rolls 11 in the present instance being idle rolls and the rolls 10 being driven. The shaft 13 is carried upon a pair of arms 14, which arms are pivotally mounted upon a shaft 15. The shaft 15 is carried by arms 16, which arms are conveniently supported upon the shaft 18, and upon a cross stay 17 fixed to the machine frame 19.

Upon the shaft 18 and rotating therewith, is a cam 20. Coöperating with the cam 20 is a cam roll 21 rotatively carried by the arms 14. The stop 12 has an enlarged end or arm 22 extending beyond the pivotal support 13, said large end 22 serving as a counter balance to cause the stop 12 to enter a cask bung hole by the action of gravity. Said enlarged end 22 also serves as an arm, which is operated on by the cam 20 to swing the stop out of the alined bung hole when the parts are in the position shown in Fig. 8. The downward swinging of the arms 14 from the position shown in Fig. 5 to the position shown in Fig. 8 by lowering rollers 11 serves likewise to deliver the alined cask to the mechanism which progresses or travels the cask farther through the machine, as will be later more fully described.

Figure 2:
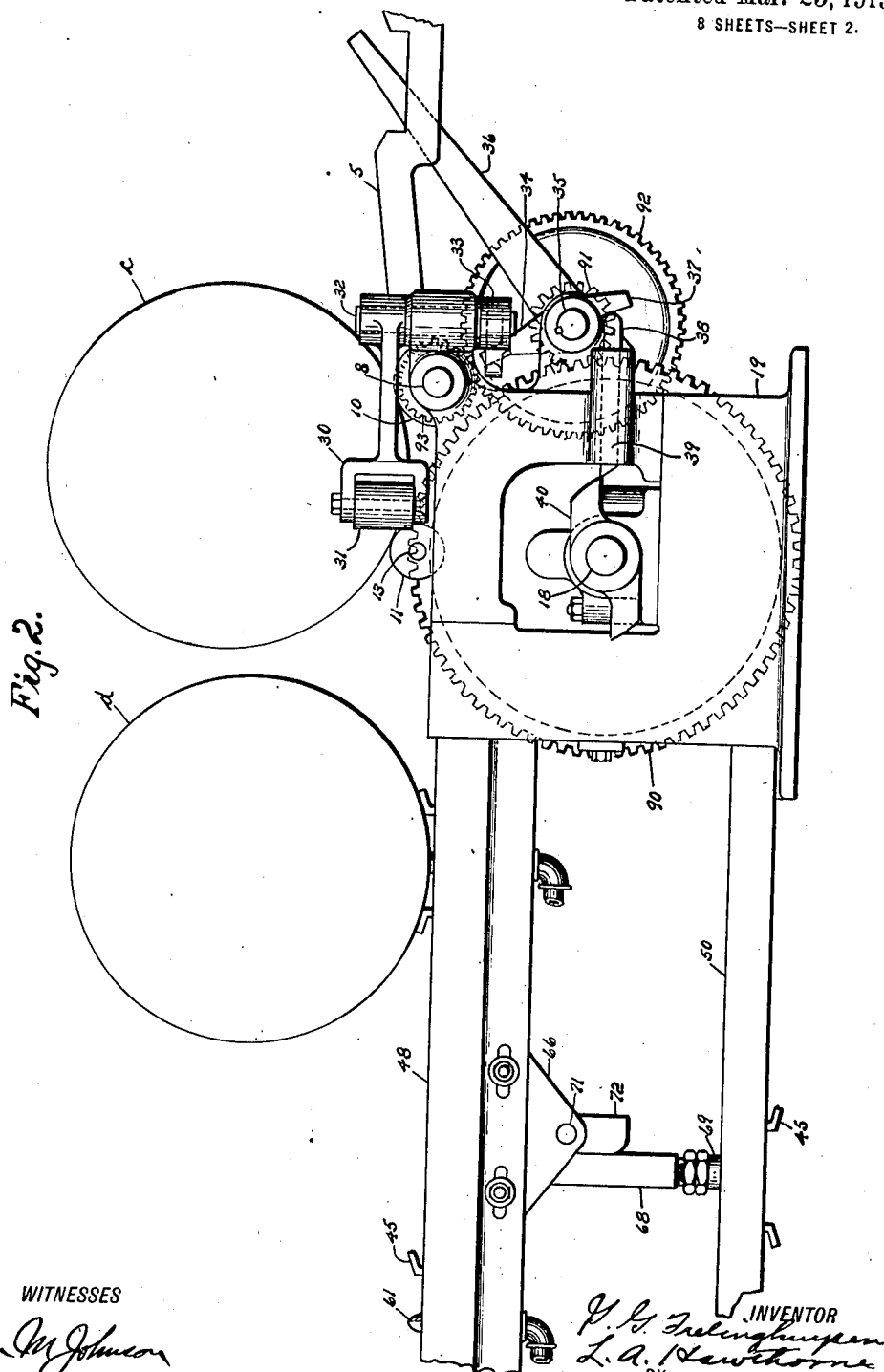

Means are provided for alining the cask longitudinally of itself so as to bring the bung hole longitudinally in alinement with the stop 12, in coöperation with its being brought circumferentially in alinement with the stop by the rollers 10 and 11. In the embodied form of such means, they coöperate with the means for automatically supplying the cask from the supply station to the alining station, as shown in Figs. 2, 4 and 9. In such embodied form, adjacent to each end of the cask at the alining station c are arms 30, each arm being provided with an alining roll 31.

The arms 30, respectively, are mounted on shafts 32, and fixed to said shafts, respectively, are arms 33. Each of the arms 33 has its free end slotted, as shown in Figs. 2 and 4. In each of the slotted ends of the levers 33 work arms 34, which arms are fixed to a shaft 35. Fixed also to the shaft 35 are arms 36, said arms extending beneath the cask b at the supply station. Means are provided for rocking the shaft 35 to effect the operative movement of the parts just described, and in the embodied form of such means there is fixed to the shaft 35 a short arm 37. Coöperating with the arm 37 is a longitudinally slidable latch 38, slidably mounted in a guideway 39 on the machine frame. Fixed to the shaft 18 is a cam finger 40, which is shown double, thus giving two actuations to the shaft 35 during each rotation of the shaft 18.

The manner of operation of the foregoing described mechanism may be briefly summarized as follows:—

The cask after being externally cleansed at the station a is automatically delivered to the supply station b. As the shaft 18 rotates, the cam finger 40, engaging the sliding latch 38, pushes the finger 37 to the right in Fig. 2, rocking shaft 35, arms 36 thus being lifted upwardly to lift the cask b out of the cradle 5, the cask thus rolling to the left in Fig. 9 onto the alining station or cradle c. As the mechanism moves backwardly in the opposite direction, after the finger 40 has passed the latch 38, the arms 30 are moved or swung inwardly toward the center of the machine, the rolls 31 thereby engaging the cask and longitudinally alining it. Suitable weights or springs may be used on the lever 36 or elsewhere if desired.

In the embodied form of the machine, and in accordance with certain features of the invention, the casks are successively subjected to internal washings by various cleansing agents, as for instance first by cold water, then by hot water, then by steam, and finally, again by cold water. In the embodied form, the alining casks are delivered to traveling cradles 45, which cradles are connected together by sprocket chains 46 at either side of the machine. The casks passing along in their cradles from one washing mechanism to another, and being subjected to the action of the washing fluid as they travel, and being finally discharged from the machine. The sprocket chains 46 are supported and guided by suitable means such as horizontally arranged Z-bars 47 and 48 supporting the upper reaches thereof and angle bars 49 and 50 supporting the lower reaches thereof. The sprocket chains 46 pass over sprocket wheels 51 and 52 fixed to the shaft 18 at the right hand end of the machine and the sprocket chains run likewise over sprocket wheels 53 and 54 at the left hand of the machine, as shown in Figs. 1 and 3.

In accordance with one feature of the invention, the various fluid injecting nozzles travel short distances with the successive casks, the fluid being injected into the casks and the washing of the cask interiors successively by the different fluids proceeding as the casks travel through the machine in their cradles, one fluid injecting nozzle being retracted from the bung hole of one cask and returning to meet a succeeding oncoming cask, the next fluid injecting nozzle is alined with said bung hole to inject the next succeeding cleansing fluid. As embodied, a plurality of nozzles are mounted in a carrier 60, which comprises a longitudinally arranged bar extending horizontally within the frame of the machine. In the carrier 60 are mounted, properly spaced apart, a succession of fluid injecting nozzles 61 each supplied by a pipe or conduit 62. Each pipe 62 is supplied with a valve 63, said valves being automatically opened and closed in a suitable manner, and as embodied a spring pressed rod 64 for each valve is mounted in the carrier 60 and positioned so that when the nozzle enters the cask bunghole, the rod comes in contact with the cask and the valve 63 is opened and as the nozzle is withdrawn the valve is closed.

Means are provided for giving the nozzles movement along with the traveling casks and backwardly to meet a succeeding oncoming cask, and also movement to and from the cask bung hole. In the embodied form of such mechanism, the carrier 60 is provided at either side thereof with series of pins 65. Mounted upon the frame of the machine, at either side of the carrier 60, and coöperating with the pins 65, are pairs of supporting and guiding plates 66, which plates are provided with suitably shaped trackways or runways 67, whereby the carrier 60 moves in one direction in one horizontal plane on top of plates 66, is then dropped to a lower plane, is moved backwardly in the opposite direction in runways 67, and is then lifted again to repeat the movement. Other component parts of such mechanism comprise downwardly projecting rods 68, fixed to the carrier 60 in a suitable manner, and provided at their lower ends with screw threaded adjustments 69. Each of the cradles 45 is provided with a cross bar 70 extending transversely from one side to the other. Mounted in the lower part of each pair of the plates 66 is a shaft 71. Pivotally mounted upon the shaft 71 is a lever having one arm 72 positioned so as to be engaged by the downwardly projecting rod 68, the other arm 72ᵃ of said lever being adapted to engage the lower side of the carrier 60 and to lift the carrier upwardly.

The manner of operation of the previously described mechanism is substantially as follows:—

The cask being alined by the finger 12 and arms 30, as already described, when the arms 14 with their rollers 11 swing downwardly to the left from the position shown in Fig. 5 to that shown in Fig. 8, the stop 12 is withdrawn from the cask bung hole and the cask itself is thereby lowered and is deposited in one of the cradles 45 carried by the sprocket chains. The cask thus comes to rest in its cradle with the bung hole in alinement with the succession of liquid injecting nozzles arranged along the machine, and is carried along by the travel of the sprocket chains. Fig. 5 shows the carrier at the right hand end of its travel and in raised position with the nozzles entered into the cask bung holes. Carrier 60 moves to the left, and at the left hand end of its travel the pins 65 pass off the top of plates 66 and the carrier 60 drops, resting on the hubs of levers 72, thereby retracting the nozzles 61 from the cask bung holes, and placing the pins 65 in alinement to enter the guideways 67. The rods 68 have dropped below the plane of the crossbars 70 carried on the various cradles 45, from the position shown in Fig. 6 to that shown in Fig. 7, and as the bars 70 continue to move toward the right, they engage the rods 68, and thus move the carrier 60 with them toward the right to the position shown in Fig. 5. At the right hand end of the travel of carrier 60, the rods 68 engage the lever arms 72, and lever arms 72ᵃ raise the carrier 60 again to the position shown in Fig. 5, thereby also lifting the rods 68 clear from cross bars 70 from the position shown in Fig. 7 to that shown in Fig. 6. By the lifting of carrier 60 the nozzles 61 are again entered into the cask bung holes. When the ends of the plates 66 are reached, the carrier 60 is again permitted to drop, the valves 63 are closed, and the mechanism is in position to repeat the cycle of operation already described.

The form of delivery shown comprises an inclined plane 80, adapted to receive the completely cleansed and sterilized cask $h$ from its cradle 45 as the latter begins to rotate about the sprocket wheels 53 and 54.

Suitable devices are provided for keeping the proper tension upon the sprocket chains, and in the embodied form thereof the sprocket wheels 53 and 54 are carried upon shaft 81, which shaft is journaled in slidable journal boxes 82 and 83. The journal box 82 is provided with an adjusting screw 84 threaded into a nut 85 in the machine frame, and the journal box 83 is provided with an adjusting screw 86 threaded in a nut 87 in the machine frame.

Suitable driving means are provided, and in the embodied form thereof a gear 90 on shaft 18 meshes with and is driven by a pinion 91, sleeved on shaft 35. Also sleeved on shaft 35 and fixed to pinion 91 is a gear 92. Gear 92 meshes with a pinion 93 on shaft 8, and sprocket 94 is also fastened on shaft 8. Sprocket 94 may be connected by a chain 95 to any convenient source of power, as a countershaft 96.

It will also be understood that the invention in its broader aspects is not limited to the precise form shown and described, but that changes may be made therein within the scope of the claims without departing from the principles of the invention and without sacrificing its chief advantages.

What we claim as our invention and desire to secure by Letters Patent is:—

1. A cask washing machine including in combination, means for alining and arresting a cask with the bung hole in nozzle receiving position, means for conveying the cask, and a nozzle and means for inserting it into the bung hole and retracting it therefrom and returning it independently of the cask conveyer to meet another cask.

2. A cask washing machine including in combination a cask conveyer, means for alining and arresting a cask and seating it upon the conveyer, a nozzle and means for inserting it into the cask bunghole after the cask is seated on the conveyer and for retracting and returning it independently of the cask conveyer to meet another cask.

3. A cask washing machine including in combination an endless conveyer carrying a cask along a straight path, means for alining and seating a cask on the conveyer, and a nozzle for injecting fluid into the cask on the conveyer, and means for traveling the nozzle along a part only of the path of the cask and for returning it to meet another cask.

4. A cask washing machine including in combination an endless conveyer carrying a cask along a straight path, means for alining and seating a cask on the conveyer, and a nozzle for injecting fluid into the cask on the conveyer, and a carrier for the nozzle traveling to and fro beneath the path of the cask.

5. A cask washing machine including in combination means for washing the interior of the cask, means for traveling a cask to said washing means, and means for alining a cask with said washing means, said alining means comprising a stop coöperating with the cask bung hole, a plurality of rollers for rotating the cask, including a roller movable to deliver the alined cask to said traveling means.

6. A cask washing machine including in combination means for washing the interior of the cask, means for traveling a cask to said washing means, and means for alining a cask with said washing means, said alining means comprising a stop coöperating with the cask bung hole, a plurality of rollers for rotating the cask, including a roller movable to deliver the alined cask to said traveling means and means operated simultaneously with the movement of said roller for withdrawing said stop from the bung hole.

7. A cask washing machine including in combination washing means, means for traveling a cask thereto from alining means, cask alining means including a movable stop for engaging the bung hole, roller equipped means for rotating a cask including a driven roller, means for moving one of said rollers to deliver an alined cask to said traveling means, a rotating shaft and cam means thereon for moving said roller and withdrawing said stop from the cask bung.

8. A cask washing machine including in combination a series of cask cradles connected to travel together, a series of nozzles for injecting fluid through the cask bung holes mounted independently of and traveling with said cradles, means for successively alining said nozzles with the casks on successive cradles to inject thereinto different washing fluids while traveling therewith, means operated by the cask for turning on the washing fluid as a nozzle passes into alinement with the cask and for turning it off as the nozzle passes out of such alinement.

9. A cask washing machine including in combination a series of cask cradles connected to travel together, a series of nozzles for injecting fluid through the cask bung holes mounted independently of and traveling with said cradles, said nozzles being successively alined with the casks on successive cradles to inject thereinto different washing fluids while traveling therewith, means for turning on the washing fluid as a nozzle passes into alinement and for turning it off as the nozzle passes out of alinement and means for alining a cask bung hole with respect to said nozzle and depositing an alined cask on each successive cradle.

10. A cask washing machine including in combination means for traveling a series of casks, a nozzle for injecting a washing fluid into the cask bung hole and traveling a part of the way with said cask traveling means and means for causing the nozzle to move toward and from the bung hole and to move with the cask and backward to meet a succeeding cask.

11. A cask washing machine including in combination means for traveling a series of casks, a nozzle for injecting a washing fluid into the cask bung hole, said nozzle traveling with the cask in one direction and returning independently, and means for causing the nozzle to move toward and from the bung hole and to move with the cask and backward independently of the cask traveling means to meet a succeeding cask and means for automatically turning on and off the washing fluid.

12. A cask washing machine including in combination a series of cask cradles connected to travel together in a horizontal plane, a nozzle for injecting fluid through the cask bung holes, said nozzle being mounted independently of but traveling with said cradles, and means for inserting the nozzle into the bung holes and retracting it therefrom.

13. A cask washing machine including in combination a series of cask cradles connected to travel together in a horizontal plane, a nozzle for injecting fluid through the cask bung holes, said nozzles traveling with said cradles in one direction and returning independently, means for inserting the nozzle into the bung holes and retracting it therefrom, and means for turning on and off the washing fluid as the nozzle is inserted and retracted.

14. A cask washing machine including in combination a series of cask cradles connected to travel together in a horizontal plane, a nozzle for injecting fluid through the cask bung holes, said nozzle being mounted independently of but traveling with said cradles, means for inserting the nozzle into the bung holes and retracting it therefrom, and means engaging the cask for turning on and off the washing fluid as the nozzle is inserted and retracted.

15. A cask washing machine including in combination a series of cask cradles connected to travel together in a horizontal plane, a nozzle for injecting fluid through the cask bung holes, and a carrier therefor having movement apart from the cask cradles, means for inserting the nozzle into a bung hole and retracting it therefrom, and means for traveling the nozzle with the cask while the nozzle is inserted in the bung hole.

16. A cask washing machine including in combination a series of cask cradles traveling together in a pathway, a plurality of fluid injecting nozzles mounted independently of the cask cradles, means for inserting into and retracting from a bung hole the various nozzles successively, and means for causing the nozzles to travel with the casks while inserted thereinto.

17. A cask washing machine including in combination horizontal trackways, a series of cask cradles resting upon and traveling along the trackways, a nozzle mounted independently of the cask cradles, for injecting washing fluid, means for inserting the nozzle into a cask bung hole and retracting it therefrom.

In testimony whereof, we have signed our names to this specification, in the presence of two subscribing witnesses.

GEORGE G. FRELINGHUYSEN.
LOUIS A. HAWTHORNE.

Witnesses:
 ROBERT B. BRADLEY,
 ERNEST M. TAPNER.